US008651945B2

(12) United States Patent
Souza et al.

(10) Patent No.: US 8,651,945 B2
(45) **Date of Patent: *Feb. 18, 2014**

(54) GAMING SYSTEM AND METHOD FOR PROVIDING DESIGNATED SYMBOL DISPLAY AREAS THAT MODIFY AWARDS

(71) Applicant: IGT, Reno, NV (US)

(72) Inventors: Roman A. Souza, Reno, NV (US); Barry Iremonger, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/654,017

(22) Filed: Oct. 17, 2012

(65) Prior Publication Data

US 2013/0053125 A1 Feb. 28, 2013

Related U.S. Application Data

(63) Continuation of application No. 13/192,165, filed on Jul. 27, 2011, now Pat. No. 8,292,726, which is a continuation of application No. 11/924,407, filed on Oct. 25, 2007, now Pat. No. 8,021,226.

(51) Int. Cl.
*A63F 13/00* (2006.01)

(52) U.S. Cl.
USPC ............................................... 463/20; 463/25

(58) Field of Classification Search
USPC ......................................... 463/20, 21, 25, 26
See application file for complete search history.

(56) References Cited

U.S. PATENT DOCUMENTS 5,152,529 A 10/1992 Okada
5,431,408 A 7/1995 Adams
5,542,669 A 8/1996 Charron et al.
6,089,977 A 7/2000 Bennett
6,120,031 A 9/2000 Adams
6,251,013 B1 6/2001 Bennett
6,311,976 B1 11/2001 Yoseloff et al.
6,322,078 B1 11/2001 Adams
6,375,570 B1 4/2002 Poole
6,439,993 B1 8/2002 O'Halloran
6,443,452 B1 9/2002 Brune
6,494,454 B2 12/2002 Adams
6,561,900 B1 5/2003 Baerlocher et al.
6,565,433 B1 5/2003 Baerlocher et al.
6,604,740 B1 8/2003 Singer et al.
6,731,313 B1 5/2004 Kaminkow
6,780,109 B2 8/2004 Kaminkow
6,786,818 B1 9/2004 Rothschild et al.
6,805,344 B2 10/2004 Abe et al.
6,851,349 B2 2/2005 Dohallow
6,866,583 B2 3/2005 Glavich et al.
6,905,406 B2 6/2005 Kaminkow et al.
6,905,408 B2 6/2005 Inoue
(Continued)

FOREIGN PATENT DOCUMENTS

WO WO 2007/018680 2/2007

*Primary Examiner* — Arthur O. Hall
*Assistant Examiner* — Allen Chan
(74) *Attorney, Agent, or Firm* — Neal, Gerber & Eisenberg LLP

(57) ABSTRACT

Gaming devices and methods of operating gaming devices are provided that include indicator or designator symbols. When an indicator or designator symbol is generated and displayed, the indicator or designator symbol indicates at least one symbol display area as a modification symbol display area. Upon at least one subsequent generation of symbols displayed in the symbol display areas, awards associated with symbols displayed in the modification symbol display areas are modified.

25 Claims, 13 Drawing Sheets

(56) References Cited

U.S. PATENT DOCUMENTS

| | | | |
|---|---|---|---|
| 6,913,532 | B2 | 7/2005 | Baerlocher et al. |
| 6,921,335 | B2 | 7/2005 | Rodgers et al. |
| 6,955,600 | B2 | 10/2005 | Glavich et al. |
| 6,981,635 | B1 | 1/2006 | Hughs-Baird et al. |
| 6,988,947 | B2 | 1/2006 | Baerlocher et al. |
| 7,014,559 | B1 | 3/2006 | Fong |
| 7,056,213 | B2 | 6/2006 | Ching et al. |
| 7,070,502 | B1 | 7/2006 | Bussick et al. |
| 7,070,503 | B2 | 7/2006 | Rudolph |
| 7,074,127 | B2 | 7/2006 | Cuddy et al. |
| 7,090,580 | B2 | 8/2006 | Rodgers et al. |
| 7,094,148 | B2 | 8/2006 | Baerlocher et al. |
| 7,115,033 | B1 | 10/2006 | Timperley |
| 7,137,888 | B2 | 11/2006 | Glavich et al. |
| 7,169,042 | B2 | 1/2007 | Muir et al. |
| 7,192,345 | B2 | 3/2007 | Muir |
| 7,195,559 | B2 | 3/2007 | Gilmore et al. |
| 7,237,775 | B2 | 7/2007 | Thomas et al. |
| 7,252,591 | B2 | 8/2007 | VanAsdale |
| 7,258,611 | B2 | 8/2007 | Bigelow, Jr. et al. |
| 7,331,866 | B2 | 2/2008 | Rodgers et al. |
| 7,371,168 | B2 | 5/2008 | Bilyeu et al. |
| 7,371,170 | B2 | 5/2008 | Cregan et al. |
| 7,396,279 | B2 | 7/2008 | Berman et al. |
| 7,399,225 | B2 | 7/2008 | Kaminkow |
| 7,402,103 | B2 | 7/2008 | Baerlocher |
| 2003/0203753 | A1 | 10/2003 | Muir et al. |
| 2004/0053676 | A1 | 3/2004 | Rodgers |
| 2005/0054436 | A1 | 3/2005 | Frizzell et al. |
| 2005/0148384 | A1 | 7/2005 | Marks et al. |
| 2006/0030392 | A1 | 2/2006 | Rodgers et al. |
| 2006/0063584 | A1 | 3/2006 | Brill et al. |
| 2006/0068875 | A1 | 3/2006 | Cregan et al. |
| 2006/0068884 | A1 | 3/2006 | Baerlocher et al. |
| 2006/0073876 | A1 | 4/2006 | Cuddy |
| 2006/0084492 | A1 | 4/2006 | Baerlocher et al. |
| 2006/0084494 | A1 | 4/2006 | Belger et al. |
| 2006/0089191 | A1 | 4/2006 | Singer et al. |
| 2006/0142077 | A1 | 6/2006 | Miles et al. |
| 2006/0205469 | A1 | 9/2006 | Schultz et al. |
| 2007/0060248 | A1 | 3/2007 | Rodgers et al. |
| 2008/0108409 | A1 | 5/2008 | Cole et al. |
| 2008/0108411 | A1 | 5/2008 | Jensen et al. |
| 2008/0113704 | A1 | 5/2008 | Jackson |
| 2008/0113735 | A1 | 5/2008 | Maya |

GAMING SYSTEM AND METHOD FOR PROVIDING DESIGNATED SYMBOL DISPLAY AREAS THAT MODIFY AWARDS

PRIORITY CLAIM

This application is a continuation of, claims priority to and the benefit of U.S. patent application Ser. No. 13/192,165, filed on Jul. 27, 2011, which is a continuation of, and claims priority to and the benefit of, U.S. patent application Ser. No. 11/924,407, filed on Oct. 25, 2007, now U.S. Pat. No. 8,021,226, the entire contents of which are each incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

To increase player enjoyment and excitement, and to increase the popularity of gaming machines, gaming device manufacturers constantly strive to provide players with new types of gaming machines that attract the player and keep the player entertained. To this end, gaming machine manufacturers attempt to provide more opportunities for the player to win and enhance the awards associated with those award opportunities.

Many gaming devices initiate a single generation and display of symbols in response to a wager by a player. For example, certain gaming machines employ a plurality of reels, wherein the reels each have a plurality of symbols. These gaming machines enable a player to place a wager on one or more paylines associated with symbol positions. The symbols on the reels are independently generated from the symbols on the other reels to provide a combination of symbols. A single activation of the set of reels typically leads to a single display of symbols arranged along the paylines to be evaluated for any awards. If a winning symbol or winning combination of symbols is generated and displayed along a wagered on payline, an award is provided to the player, and the game ends. If a winning symbol or combination of symbols is not generated and displayed along a wagered on payline, no award is provided to the player for that payline.

Improvements to gaming devices have been known to include enhancement of the awards associated with award opportunities. Conventional gaming devices employ different components to enhance a player's outcome in a game. One such component is a modifier. A modifier, such as a multiplier, enables players to obtain larger outcomes, such as larger awards in a game. A multiplier increases the award amount proportionally to the value of the multiplier. For example, a "2×" multiplier pays twice the normal award value. A "3×" multiplier pays three times the normal award value. Therefore, a multiplier can substantially enhance a player's award.

Gaming device manufacturers strive to make gaming devices that provide as much enjoyment and excitement as possible. Providing a game in which a player has multiple opportunities to win an award and potentially large awards such as credits are ways to enhance player enjoyment and excitement. Players are also attracted to gaming devices which provide new game schemes and interactive features including different ways of enhancing awards associated with winning symbol combinations or different types of triggering events. Therefore, to increase player enjoyment and excitement, it is desirable to provide players with new game schemes and features for gaming devices which include new and different ways of providing additional award opportunities and enhancing the awards provided to the players in a game. A continuing need thus exists to provide new and exciting gaming devices and methods.

SUMMARY

The present disclosure describes embodiments related to gaming systems, gaming devices and methods of operating gaming devices. In particular, the present disclosure describes embodiments related to gaming systems, gaming devices and methods of operating gaming devices that generate and display symbols in symbol display areas and provide awards based on winning symbols or combinations of displayed symbols. In various embodiments described herein, an award associated with a winning symbol or winning combination of symbols is modified based on whether that winning symbol or at least one of the symbols of that winning combination of symbols is generated and displayed in a symbol display area that has been designated as a modification symbol display area.

In various embodiments described herein, when the gaming device generates and displays at least one indicator or designator symbol, the gaming device causes at least one symbol display area to be designated as a modification symbol display area. In one embodiment, the displayed indicator symbol indicates at least one of the symbol display areas, such as, the symbol display area in which the indicator or designator symbol is generated and displayed. In one embodiment, the indicator or designator symbol indicates at least one symbol display area if the indicator or designator symbol is displayed in a predetermined symbol display area such as a symbol display area in a position central to other symbol display areas.

In an alternative embodiment, the indicator or designator symbol changes position, orientation or shape to indicate at least one symbol display area. For example, the shape of the indicator or designator symbol may project or point in a direction toward a symbol display area to indicate that symbol display area as a modification symbol display area. The modification symbol display area may be identified to the player by a change in its appearance or shape such as highlighting or using any other suitable method of identifying the modification symbol display area.

In various embodiments described herein, an indicator or designator symbol may indicate more than one of the symbol display areas. The number of symbol display areas indicated by the indicator symbol may be randomly determined, predetermined or determined on any suitable parameter such as an event in a game or an amount of a wager.

In various embodiments described herein, the modification symbol display area remains indicated through one or more subsequent generations of symbols displayed in the symbol display areas. In such embodiments, an award associated with a winning symbol or at least one of the symbols of a winning combination of symbols subsequently generated to be displayed in a modification symbol display area is modified. For instance, the amount of the award may be modified according to any suitable mathematical operation that increases the amount of the award, such as by addition to the award amount, a multiplication of the award amount, or a decrease of the amount of the award, such as by subtraction from the award amount, or division of the award amount.

In various embodiments described herein, the modification symbol display area remains indicated for any suitable number of subsequent generations of symbols to be displayed in the symbol display areas. The modification symbol display area may remain indicated for sequential or intermittent subsequent symbol generations. The duration or frequency with which a modification symbol display area is indicated during subsequent symbol generations may be randomly determined, predetermined or based or determined on any suitable parameter such as an event in a game, an amount of a wager, a number of plays, an amount of time played or an accumulated wager or wager pool.

It should be appreciated that in alternative embodiments, the selection of one or more of the modification symbol display areas and for how many activations each modification symbol display area will remain active can be determined in other suitable methods such as other random determinations, time based, wager based or player based.

In various embodiments described herein, the modification symbol display area may be associated with a modifier that is different from a modifier associated with another symbol display area. In an embodiment, if more than one symbol of a winning combination of symbols is displayed in an indicated symbol display area, the award associated with the winning combination is modified using the modification methods associated with each such respective symbol display area.

Additional features and advantages are described herein, and will be apparent from, the following Detailed Description and the figures.

DETAILED DESCRIPTION

The present disclosure may be implemented in various configurations for gaming system, gaming machines, or gaming devices, including but not limited to: (1) a dedicated gaming machine or gaming device, wherein the computerized instructions for controlling any games (which are provided by the gaming machine or gaining device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player, in another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
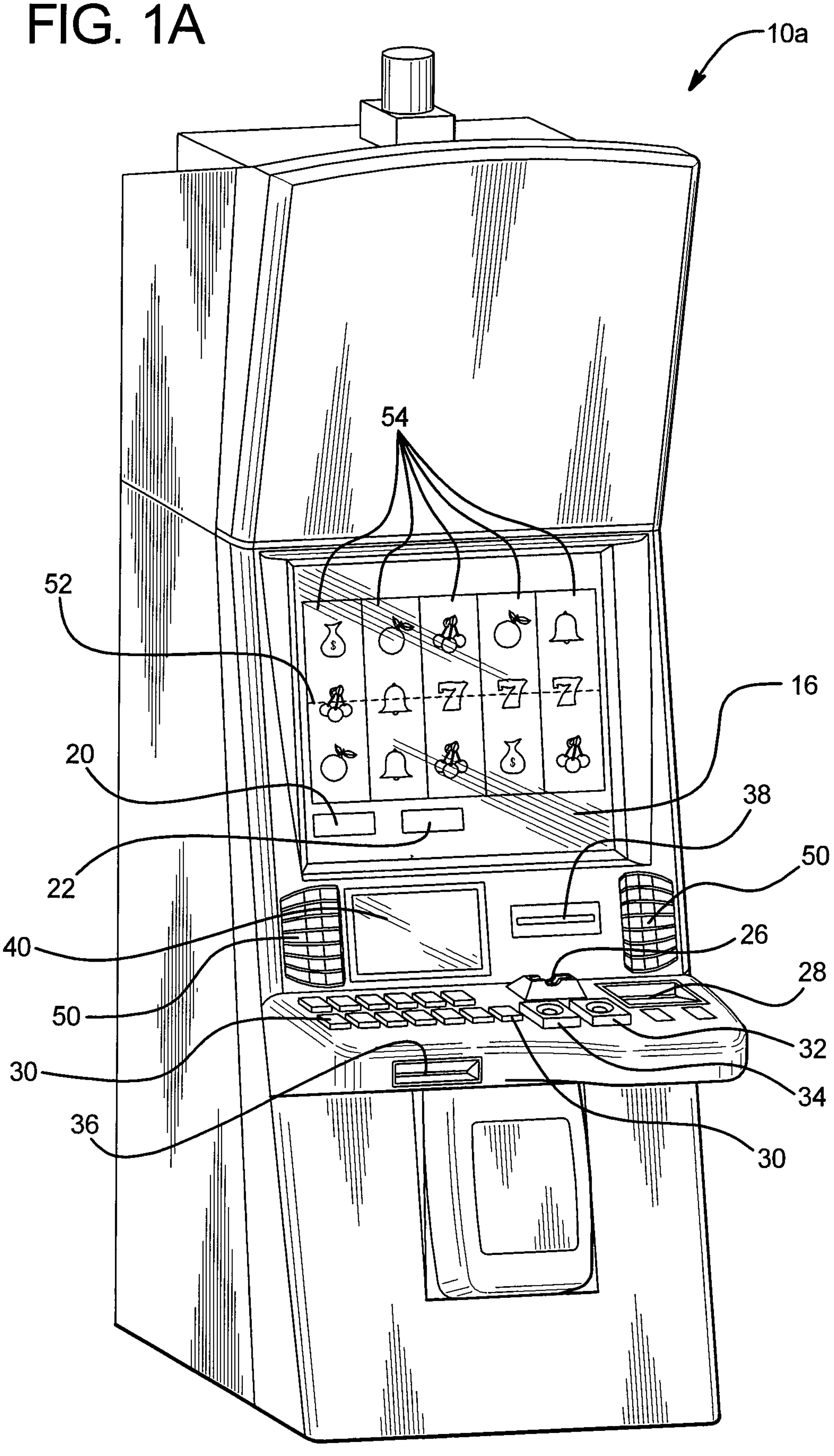
FIGS. 1A and 1B are front perspective views of various embodiments of a slot machine embodiment of a gaming device.
Figure 1B:
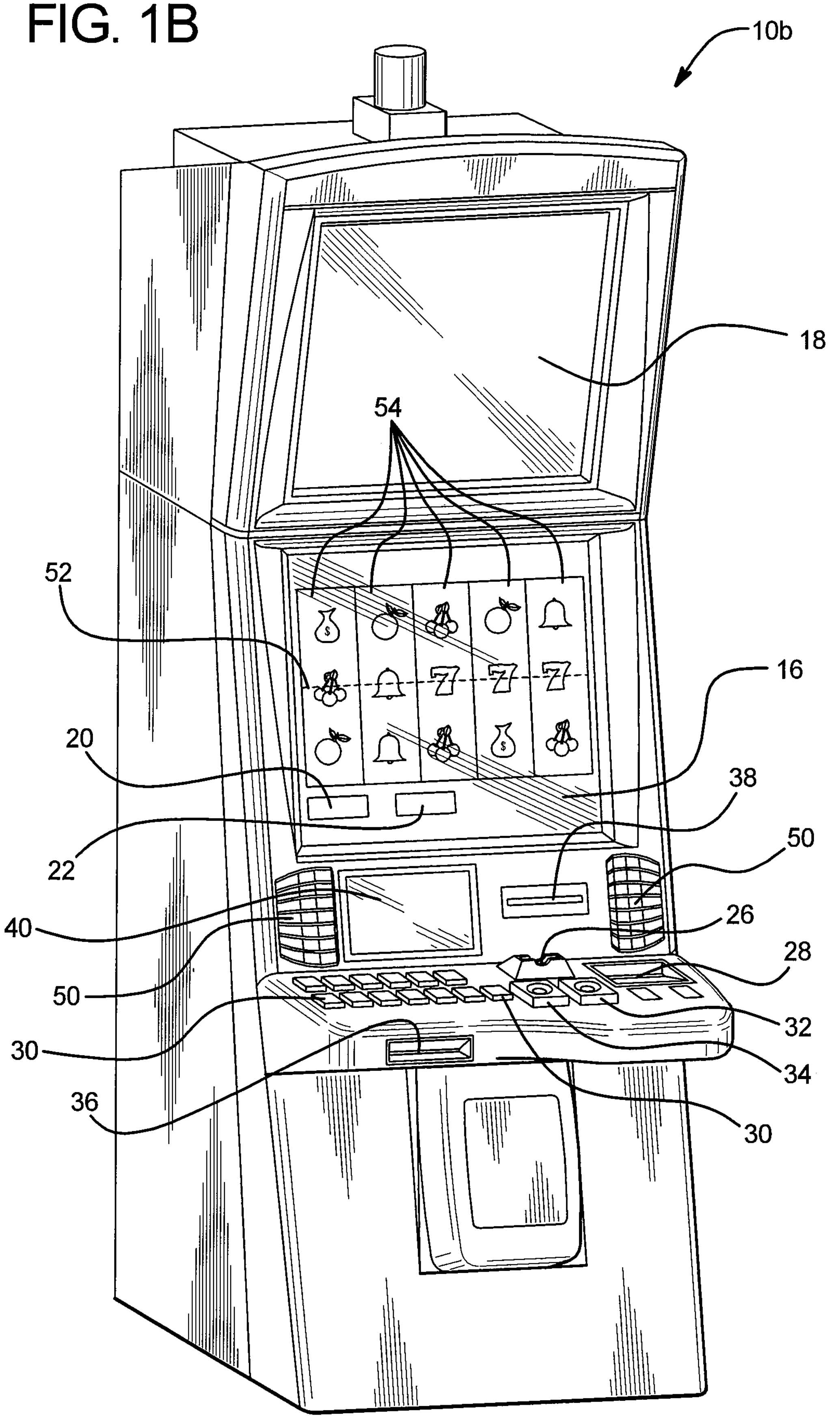

Referring now to the drawings, two example alternative embodiments of the gaming device of the disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
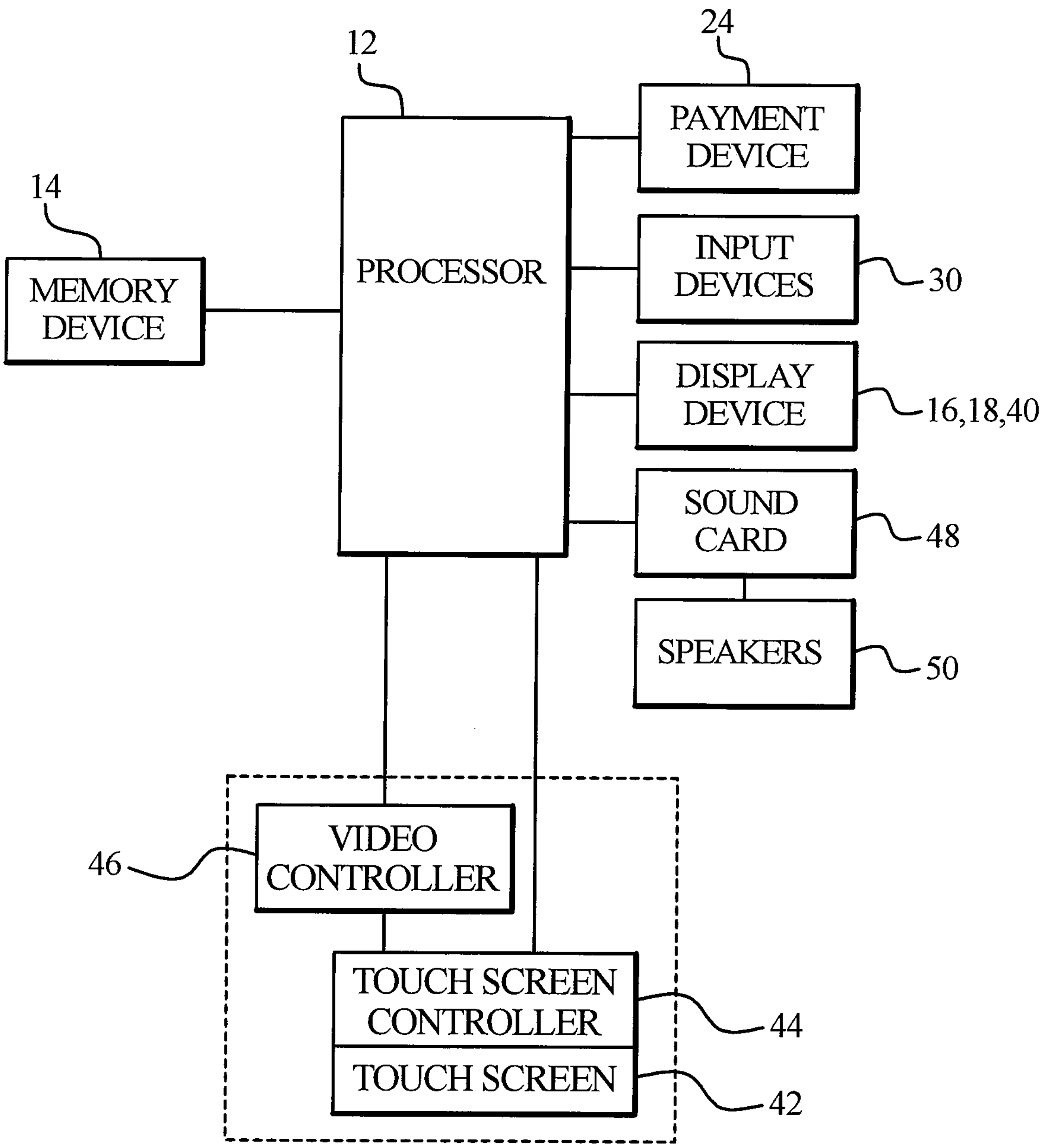
FIG. 2A is a schematic block diagram of the electronic configuration of one embodiment of a gaming device.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel. The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 13, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
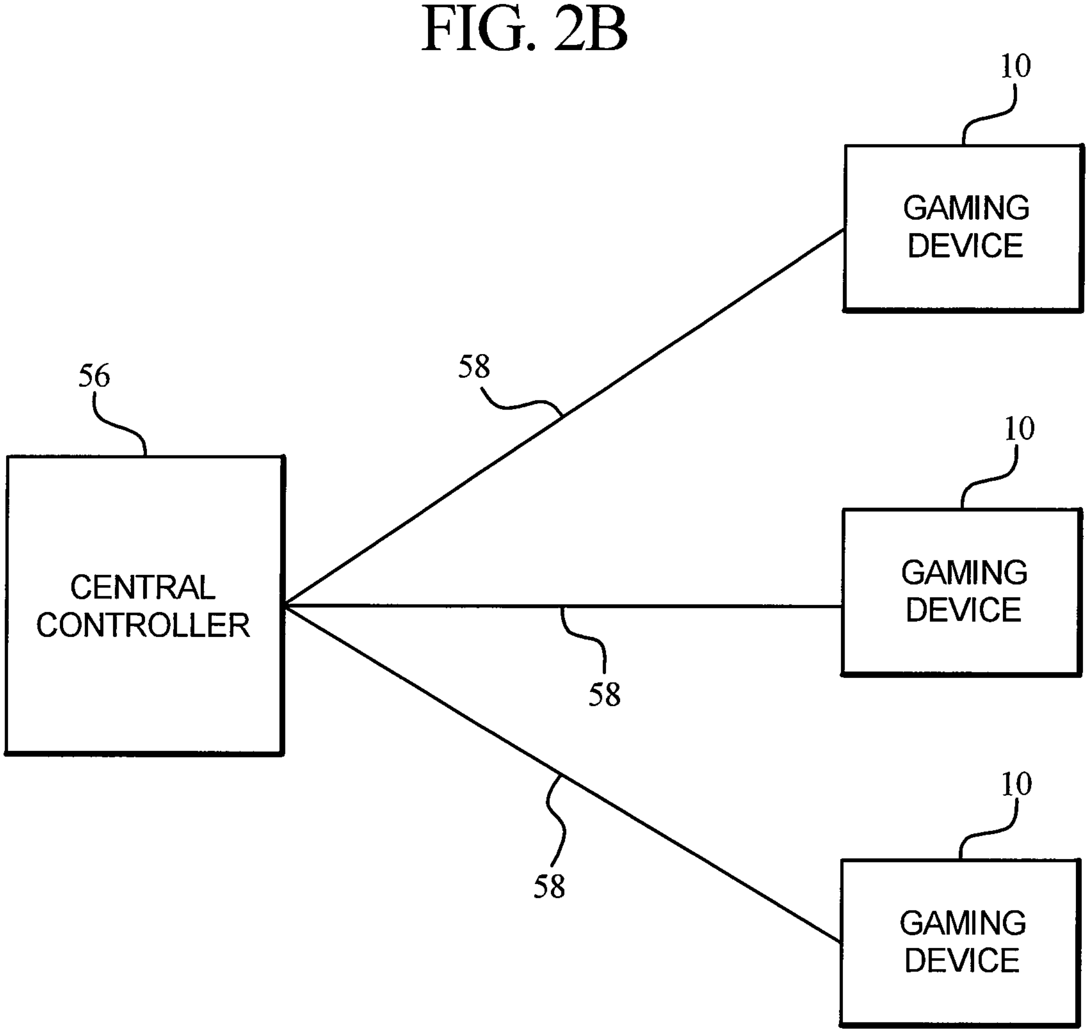
FIG. 2B is a schematic block diagram of various gaming devices are networked to a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

EXEMPLARY EMBODIMENTS

Referring now to FIGS. 3, 4, 5, 6, 7, 8A, 8B, and 9, an exemplary embodiment of the present disclosure includes a display device 16, 18 configured to display a plurality of symbols such as A, B, C, D, E, F, G, H, I, J, K, L, M, N and O in a plurality of symbol display areas 100 such as symbol display areas 102, 104, 106, 108, 110, 112, 114, 116, 118, 120, 122, 124, 126, 128 and 130, respectively. The symbols may include any suitable markings or indicia such as letters (as illustrated), numbers, or illustrations or pictures of objects such as fruit. The symbol display areas may include at least two symbol display areas arranged in any suitable manner such as a matrix. A matrix of symbol display areas may include a 3×3 matrix, a 4×5 matrix, a 5×5 matrix, a 3×5 matrix (as illustrated in FIGS. 3, 4, 5, 6, 7, 8A, 8B, and 9), or any other suitable arrangement of symbol display areas. The arrangement may be circular, octagonal, or any other suitable shape. The symbols generated to be displayed in the symbol display areas may be displayed on one or more reels such as reels 54*a*, 54*b*, 54*c*, 54*d* and 54*e* illustrated in FIGS. 3, 4, 5, 6, 7, 8A, 8B, 9 and 10. One embodiment includes one or more independent reels, each adapted to display a symbol in a single symbol display area. The reels may be in mechanical or electronic form as described above.

As illustrated in FIGS. 3, 4, 5, 6, 7, 8A, 8B, and 9, the display in one embodiment displays a paytable 140. In the illustrated embodiment, the combination of five A symbols is associated with an award amount of twenty-five credits. Similarly, the combination of four B symbols is associated with an award amount of fifteen credits; the combination of four C symbols is associated with an award amount of ten credits; and the combination of three D symbols is associated with an award amount of five credits. Embodiments described herein may include any suitable number of paytables and any suitable number of awards or award amounts. An award amount may be associated with any suitable number of symbols or combinations of symbols. An award amount may be associated with any suitable symbol or a combination of any suitable number of symbols. The amounts of the awards can be any suitable amounts.

The display may further include one or more displays of an amount of a wager, an outcome, an award amount or modifier associated with an event in a game, a total amount of an award upon any modification of the award amount, a grand total amount of the cumulative award amount for all events in a game or games, a remaining number of generations of symbols for a particular wager (such as in a game with free spins), or any other suitable parameter of a game. Display 16, 18 of the illustrated embodiment, for example, includes a Bet display 150, a Credits display 154, a Multiplier display 156, a Total Award display 158 and a Grand Total Award display 160. In addition, displays 16 and/or 18 includes a display of the number of symbol generations or spins of the reels through which an indicated symbol display area remains associated with a modifier as indicated by the Number of Spins for Modifier display 152 in the illustrated embodiment.

In various embodiments, the gaming device generates a plurality of symbols to be displayed in the symbol display areas upon each wager by a player. In other embodiments, a player is provided more than one generation of symbols to be displayed in symbol display areas of the display. These generations of symbols can be paid for or free activations. In different embodiments the number of symbol generations provided to the player is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

Figure 3:
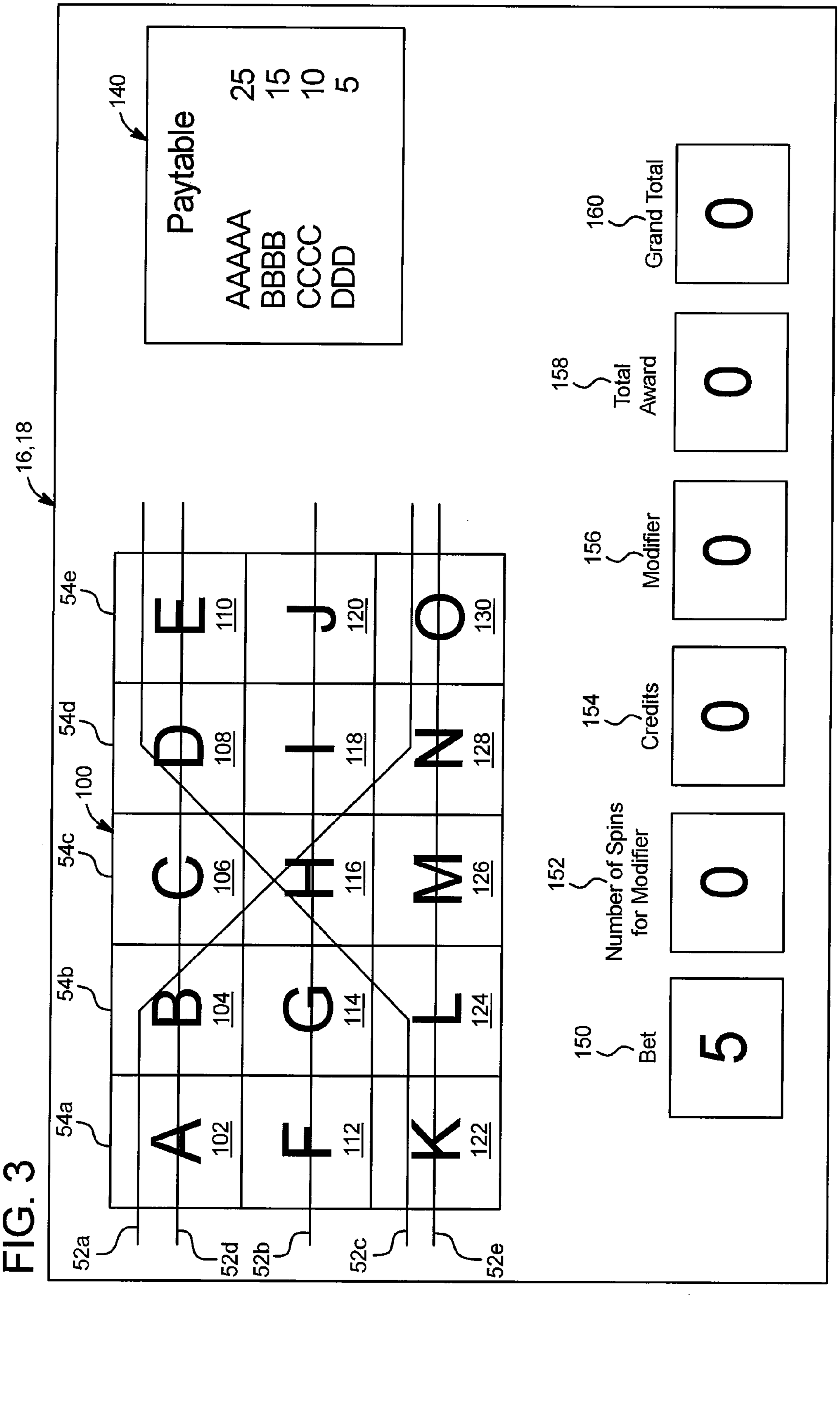
FIGS. 3, 4, 5, 6, 7, 8A, 8B, 9, and 10 are front views of a display device illustrating the modification of awards through multiple symbol generations in an exemplary embodiment of the present disclosure.

As illustrated in FIG. 3, a player places a wager of five credits as indicated in Bet display 150 to activate paylines 52*a*, 52*b*, 52*c*, 52*d* and 52*e*. Payne 52*a* is associated with symbol display areas 102, 104, 106, 108 and 110; payline 52*b* is associated with symbol display areas and 112, 114, 116, 118 and 120; payline 52*c* is associated with symbol display areas 122, 124, 126, 128 and 130; payline 52*d* is associated with symbol display areas 102, 104, 116, 128 and 130; and payline 52*e* is associated with symbol display areas 122, 124, 116, 108 and 110.

Figure 4:
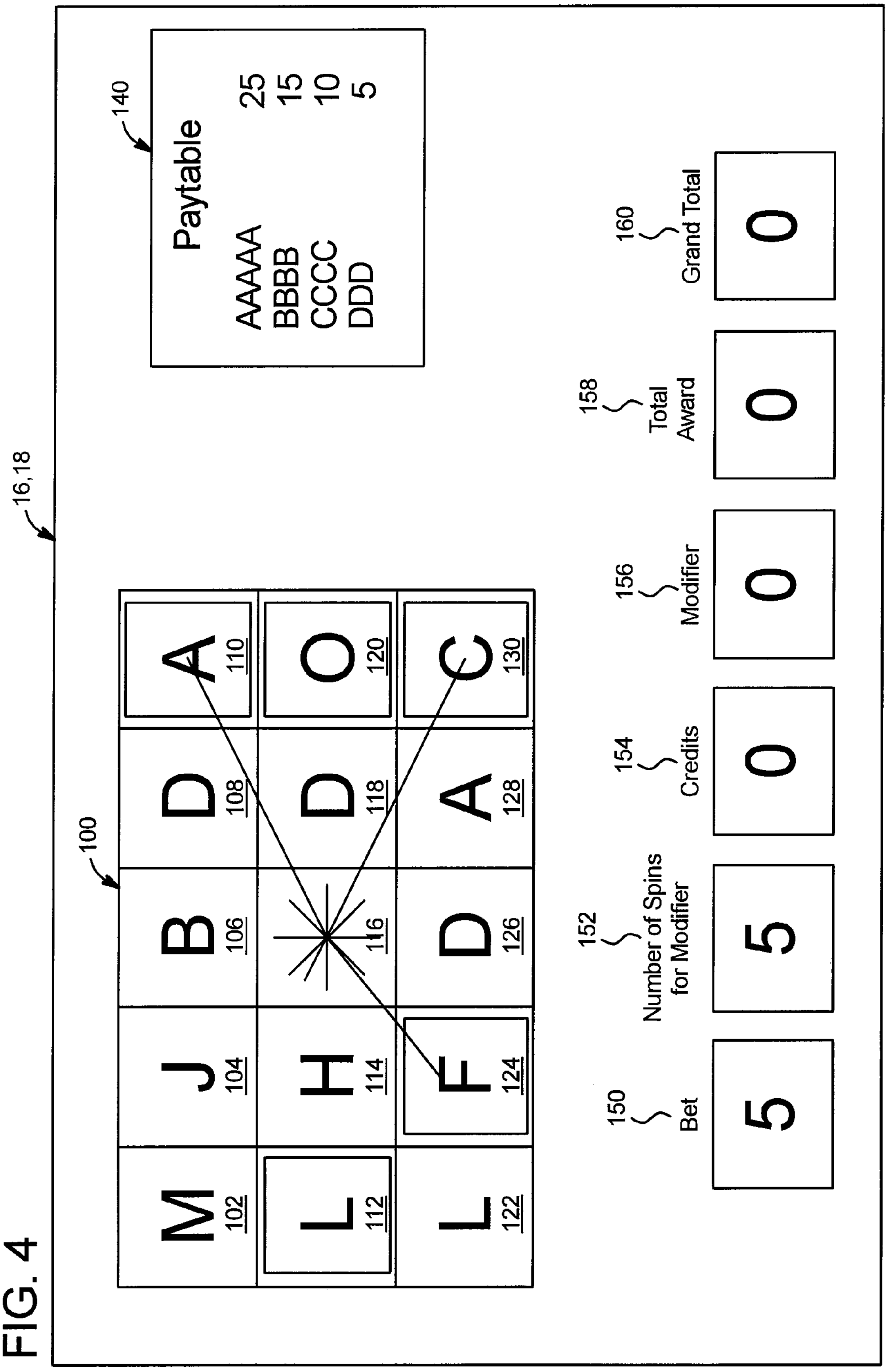

Referring to FIG. 4 in the illustrated embodiment, the player activates the reels to cause the gaming device to generate a plurality of symbols to be displayed by the set of reels 54 in the symbol display areas 100. In various embodiments described herein, one or more indicator symbols may be generated and displayed in the symbol display areas of the display. In various embodiments, one or more indicator or designator symbols may be generated and displayed in certain symbol display areas of the display such as, for example, in a symbol display area positioned central to other symbol display areas. As illustrated in FIG. 4, the indicator symbol 170 is generated and displayed in symbol display area 116, in the middle row and in the middle column of the 5×3 matrix of symbol display areas 100. In this exemplary embodiment, the indicator symbol 170 is illustrated as a star shaped indicia. It should be appreciated however, that the indicator symbol may include any suitable indicia.

In one embodiment described herein, the indicator or designator symbol is adapted to indicate or designate one or more symbol display areas. The gaming device may cause the indicator symbol to indicate the symbol display area in which it is displayed or another symbol display area by any suitable method such as by changing the appearance, shape, orientation or position of the indicator symbol, or adding elements to the indicator symbol. In particular, the indicator symbol may simultaneously or sequentially extend in the direction of each of the modification symbol display areas, and, in an embodiment, contact the symbol display area to be indicated or designated. As illustrated in FIG. 4, the indicator symbol 170 changes shape to indicate symbol display areas 110, 112, 120, 124 and 130.

Once a symbol display area is indicated, the modification symbol display area may be visually distinguished from other symbol display areas. For example, the appearance of the modification symbol display areas may be changed or may include additional elements. In the embodiment illustrated in FIG. 4, the modification symbol display areas are highlighted as indicated, for example, by the inner box 162 associated with modification symbol display area 110.

In different embodiments, the number of symbol display areas indicated by the indicator symbol is predetermined, randomly determined, determined based on the player's status (such as determined through a player tracking system), determined based on a generated symbol or symbol combination, determined based on a displayed event in the game, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria. For example, the number of symbol display areas may be based upon the wager made when the indicator symbol was generated and displayed. For example, in the illustrated embodiment, because the player placed a wager of five credits, the indicator symbol indicates five of the symbol display areas.

In various embodiments, a modification symbol display area may remain indicated for any suitable number of subsequent symbol generations. In different embodiments, the number of subsequent symbol generations during which a modification symbol display area remains indicated is predetermined, randomly determined, determined based on the player's status (such as determined through a player tracking system), determined based on a generated symbol or symbol combination, determined based on a displayed event in the game, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria. For example, in the illustrated embodiment, because the player places a wager of five credits, the symbol display areas indicated by the indicator symbol remain indicated for five generations of symbols in the symbol display areas or spins of the reels as displayed to the player in the Number of Spins for Modifier display 152. These symbol display areas may remain indicated for a number of sequential or intermittent symbol generations.

Figure 5:
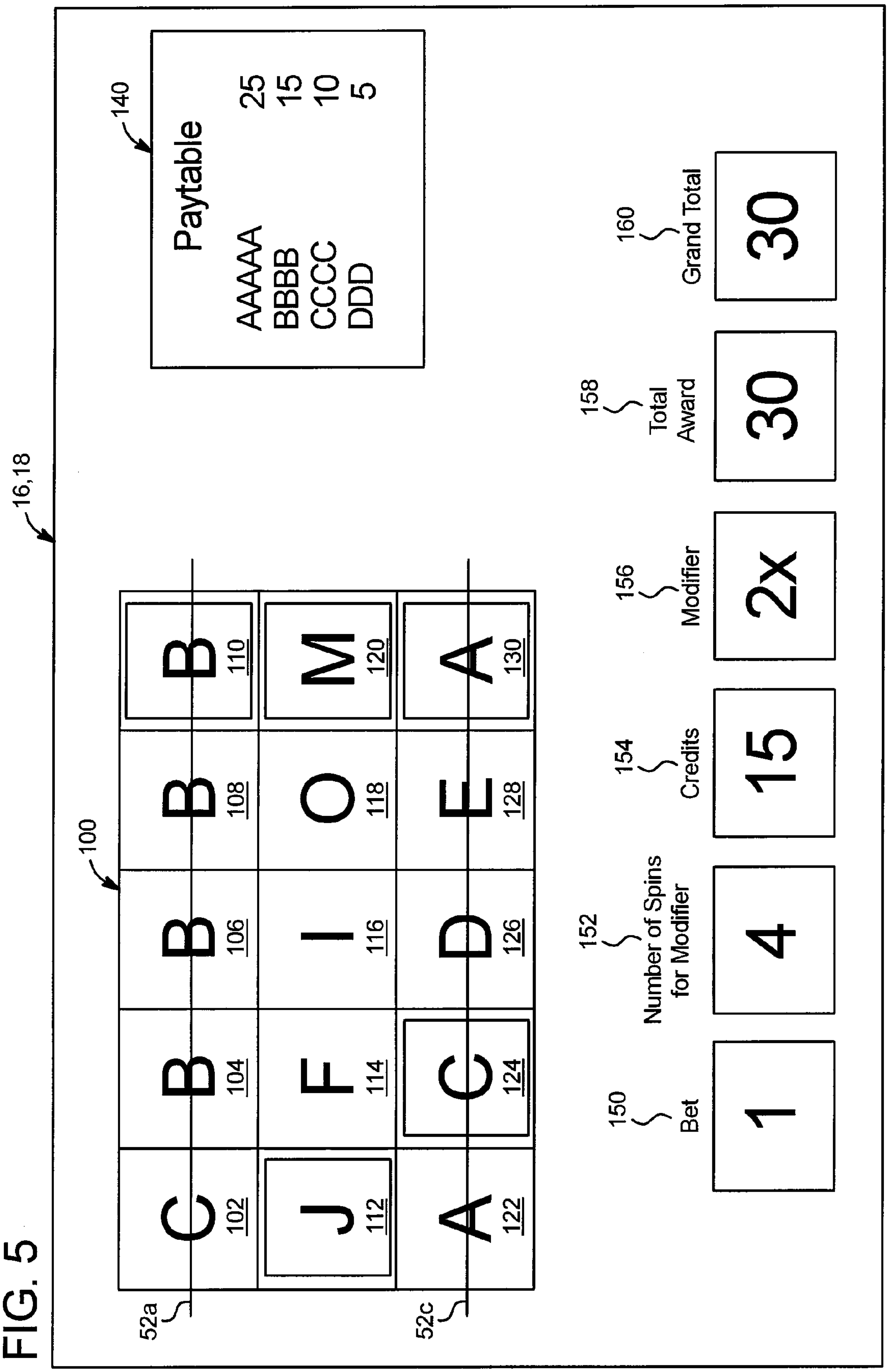

Referring to FIG. 5, in the illustrated embodiment, a modifier is associated with each indicated symbol display area, or modification symbol display area. A modifier may modify an award by any suitable mathematical operation including addition, subtraction, multiplication, division, and the like. In the illustrated embodiment, a multiplier of 2× is associated with each of the modification symbol display areas. It should be appreciated, however, that a modifier associated with one modification symbol display area may be different than a modifier associated with another modification symbol display area.

As illustrated in FIG. 5, the player makes a wager of one credit to activate payline 52*a* as indicated by the Bet display 150. Upon activation of the reels 54, a plurality of symbols are generated and displayed in the symbol display areas 100. Also the number of spins during which the modification symbol display areas will remain associated with a modifier is decreased by one as indicated by the Number of Spins for Modifier display 152. As illustrated in FIG. 5, four "B" symbols are displayed in symbol display areas 104, 106, 108 and 110 along payline 52*a*. According to the paytable 140, an award amount of fifteen credits is associated with four "B" symbols. The fifteen credits is indicated in the Credits display 154.

As further illustrated in FIG. 5, one of the four "B" symbols of the winning combination is displayed in a modification symbol display area 110. The 2× modifier indicated in the Multiplier display 156 is applied to the award amount of fifteen credits associated with the winning combination of four "B" symbols to provide an award amount of thirty credits as indicated in the Total Award display 158. Accordingly, the cumulative total of award amounts from play of the game is thirty credits as indicated in the Grand Total Award display 160. It should be appreciated that, in the illustrated embodiment, modification symbol display areas in this embodiment, 112, 120, 124 and 130 are not associated with a wagered-on payline and, according to paytable 140, no award is associated with the combination of symbols displayed in those modification symbol display areas. Therefore, in this embodiment, the modifiers associated with modification symbol display areas 112, 120, 124 and 130 are not applied to any award.

Figure 6:
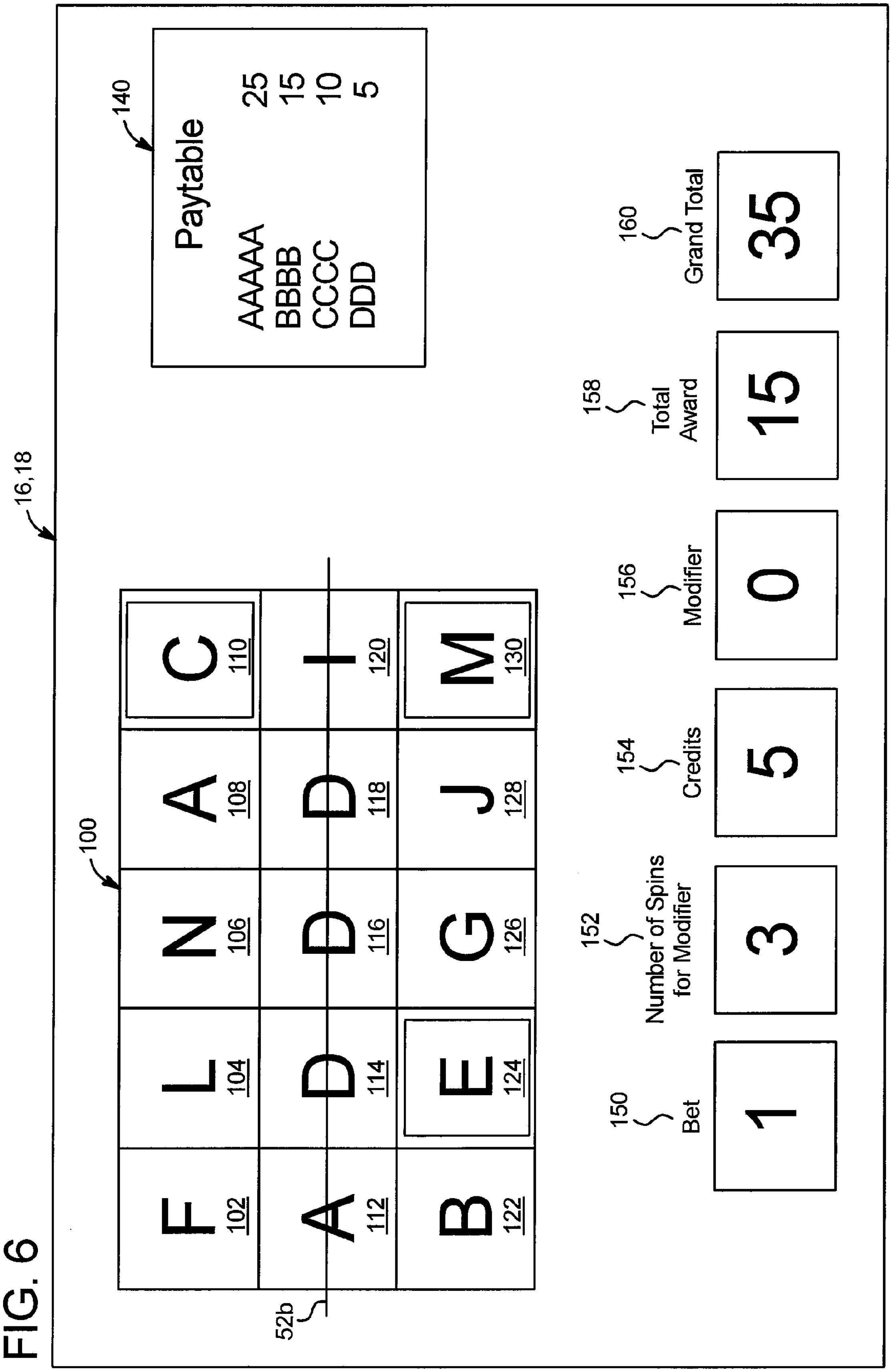

In one embodiment described herein, if no symbols of a winning combination of symbols are displayed in modification symbol display areas, the award associated with the winning combination is not modified. For example, as illustrated in FIG. 6, the player wagers one credit on payline 52*b* to cause the subsequent spin of the reels in the exemplary embodiment. Among other symbols, the gaming device generates and displays a winning combination of three "D" symbols in symbol display areas along payline 52*b*. None of the "D" symbols, however, are displayed in modification symbol display areas. Therefore, the award amount of five credits indicated in the Credits display 154 is not modified, and the award amount of five credits is added to the previous total of thirty credits to produce a cumulative total of thirty-five credits as indicated in the Grand Total display 160. As indicated in the Number of Spins for Modifier display 152, the modifiers are associated with the modification symbol display areas for three more spins or activations.

Figure 7:
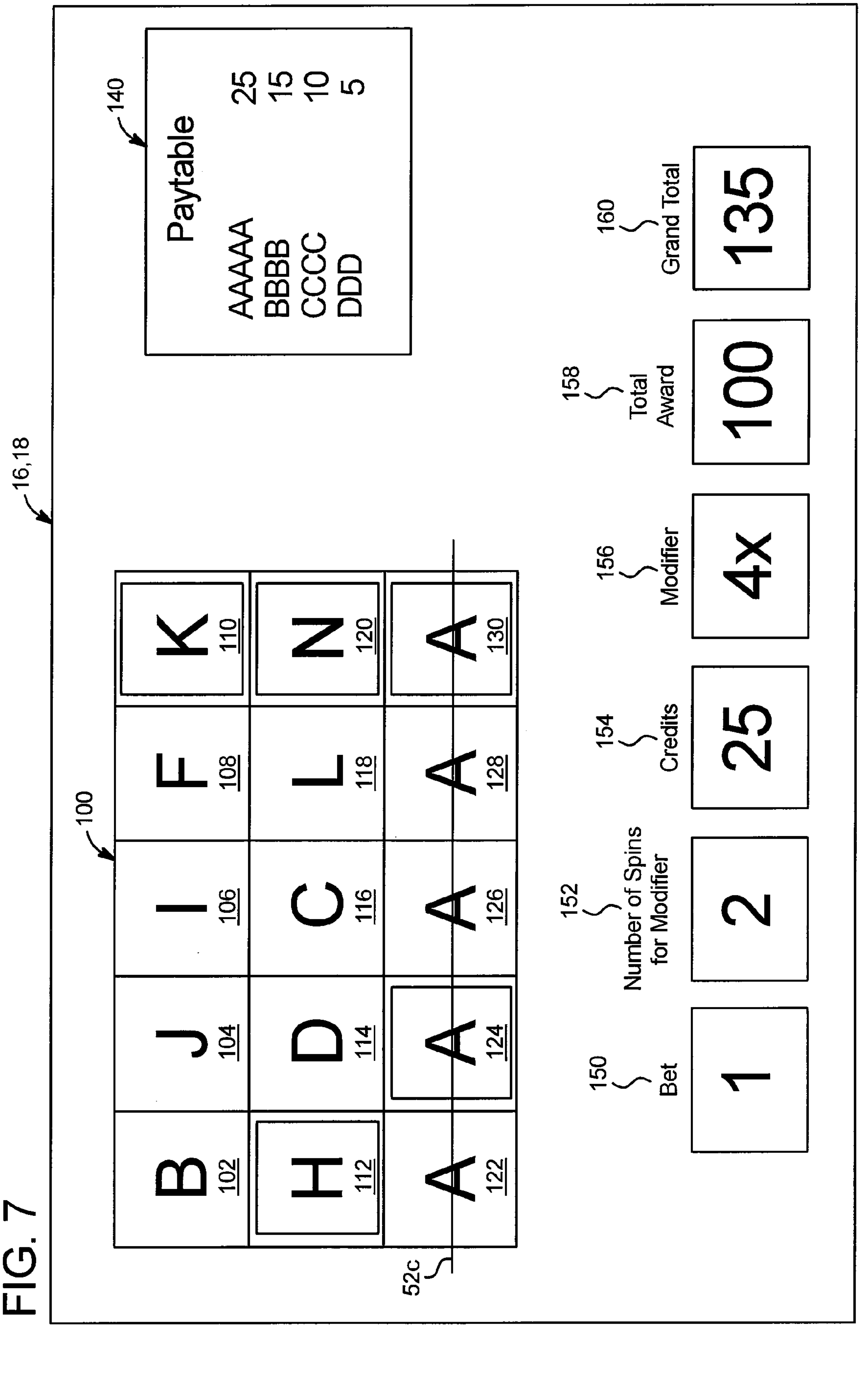

In various embodiments described herein and referring to FIG. 7, the player places a wager of one credit on paylines 52*c* and 52*e*, more than one symbol of a winning combination of symbols may each be displayed in a modification symbol display area. For example, as illustrated in FIG. 7, a winning combination of five "A" symbols is generated and displayed in symbol display areas along payline 52*c*. According to paytable 140, an award amount of twenty-five credits is associated with each of the five "A" symbol combinations to equal an award amount for this spin of the reels of twenty-five credits as indicated in Credits display 154.

In different embodiments, the number of paylines which may run through a modification symbol display area is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In various embodiments described herein, an award is modified by each of the modifiers associated with modification symbol display areas displaying symbols of a winning combination. Modifiers associated with modification symbol display areas displaying symbols of a winning combination may be combined in any suitable manner, such as by being added or multiplied together to provide an enhanced modifier. For example, as illustrated in FIG. 7, two of the "A" symbols of the winning combination of symbols are displayed in symbol display areas 124 and 130. In the illustrated embodiment, a 2× multiplier is associated with each of the modification symbol display areas. Therefore, a 2× modifier is associated with modification symbol display area 124, and a 2× modifier is associated with modification symbol display area 130. In an embodiment, the 2× multiplier associated with modification symbol display area 124 is added to the 2× multiplier associated with modification symbol display area 130 to produce a 4× multiplier. The 4× multiplier is then applied to the award of twenty-five credits to produce an award of one hundred credits as indicated in the Total Award display 153. The one hundred credits is added to the previous grand total award of thirty-five credits to produce a cumulative grand total award of one hundred credits as indicated in the Grand Total Award display 160. Again, the Number of Spins for Modifier display 152 is decreased by one.

It should be appreciated that any suitable mathematical operation may be performed on the multipliers associated with each of the modification symbol display areas. In different embodiments, which mathematical operation is performed in association with each multiplier is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

Figure 8A:
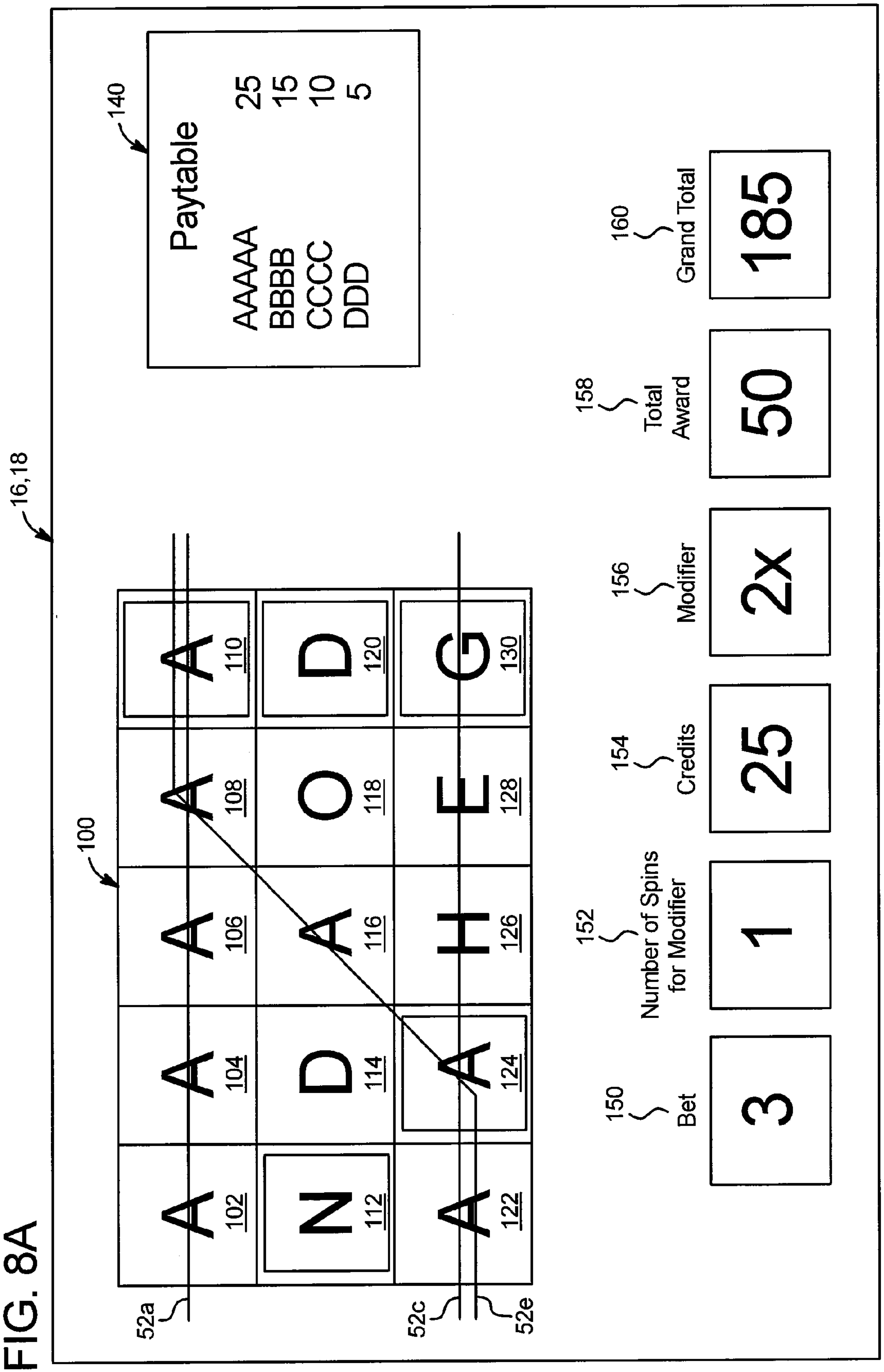

Referring now to FIG. 8A, the player places a wager of three credits on paylines 52*a*, 52*c* and 52*e*. A winning combination of five "A" symbols is generated and displayed in the symbol display positions along paylines 52*a* and 52*e*. One of the "A" symbols displayed along payline 52*a* is displayed in a modification symbol display areas, and, in particular, in modification display area 110. In the illustrated embodiment, each of the modifier symbol display areas is associated with a 2× modifier; therefore, the 2× modifier associated with modification symbol display area 110 is applied to the award of twenty-five credits to produce an award of fifty credits.

Figure 8B:
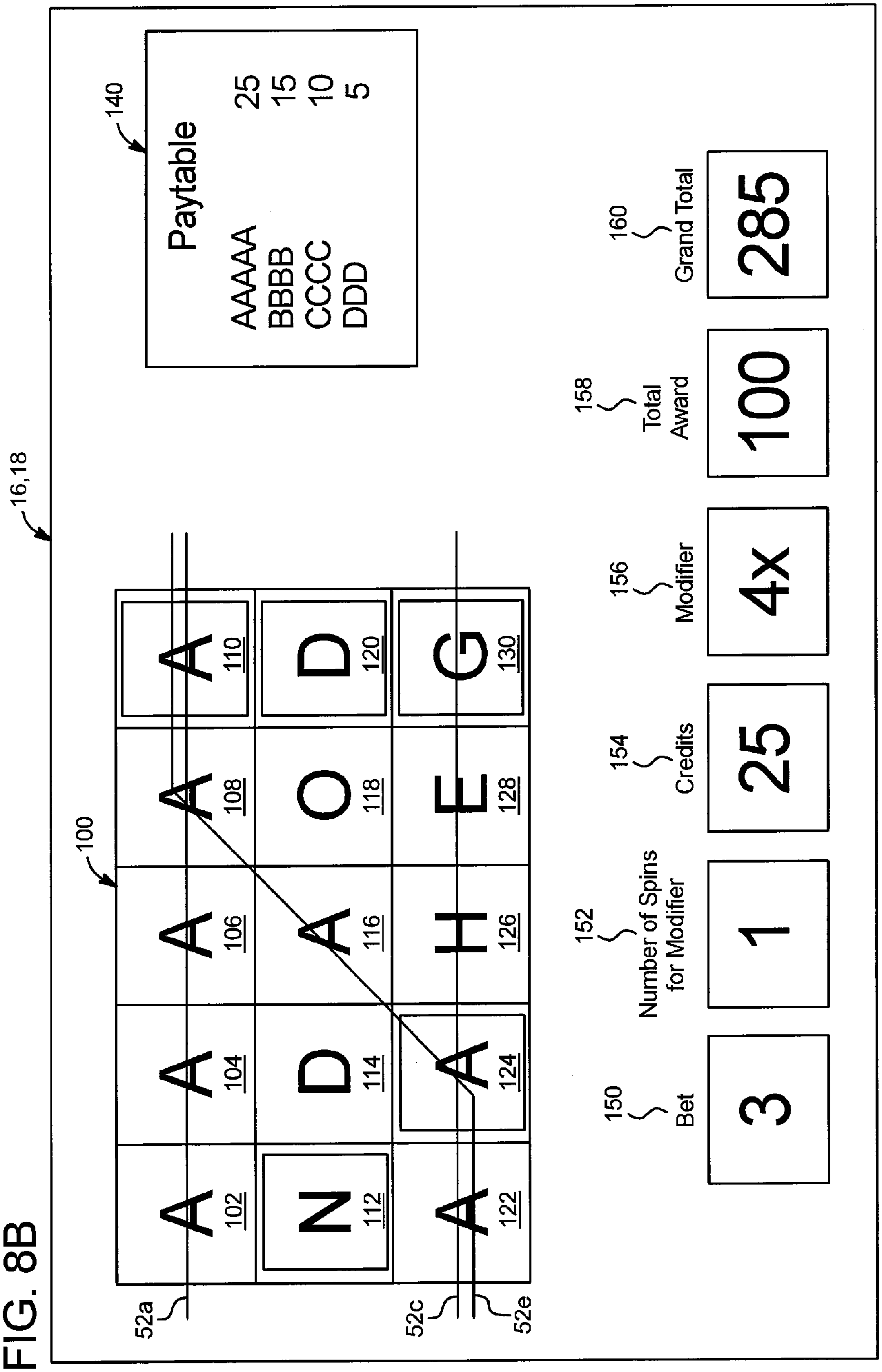

Similarly, in FIG. 8B, a winning combination of five "A" symbols is generated and displayed in the symbol display positions along payline 52*e*. Two of the "A" symbols displayed along payline 52*e* are displayed in modification symbol display areas, and, in particular, in modifier display areas 110 and 124. In the illustrated embodiment, each of the modification symbol display areas is associated with a 2× modifier. Each of the 2× modifiers is applied to the award of twenty-five credits associated with the winning combination of five "A" symbols to produce an award of one hundred credits. This award is added to the modified award associated with the winning combination of symbols displayed along payline 52*a* to produce a total award for this spin of the reels 54 of one hundred fifty credits as indicated in the Total Award display 158. The total award is added to the previous grand total award to produce a cumulative grand total award of two hundred eighty-five credits as indicated in the Grand Total award display 160.

Figure 9:
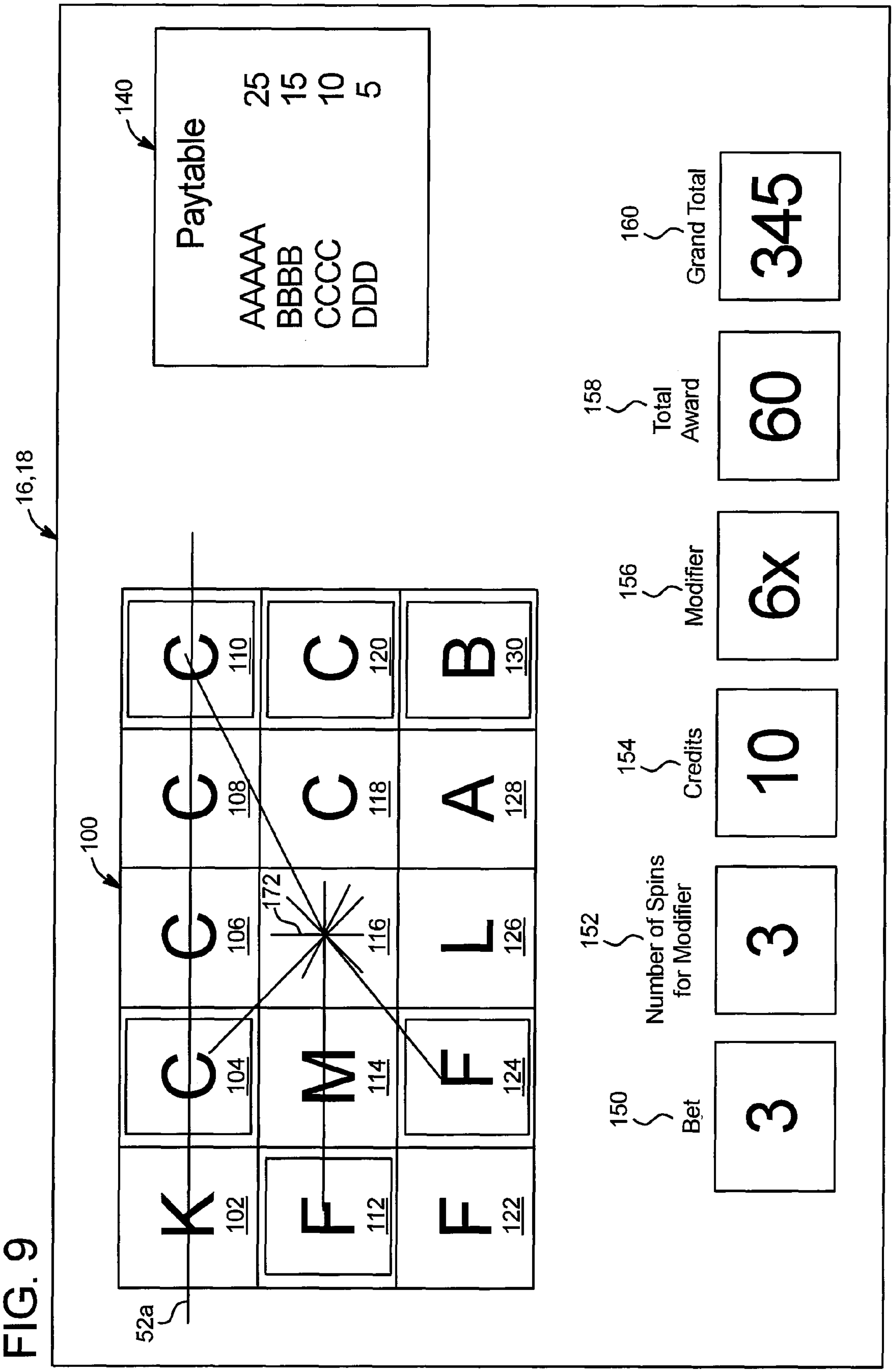
Figure 10:
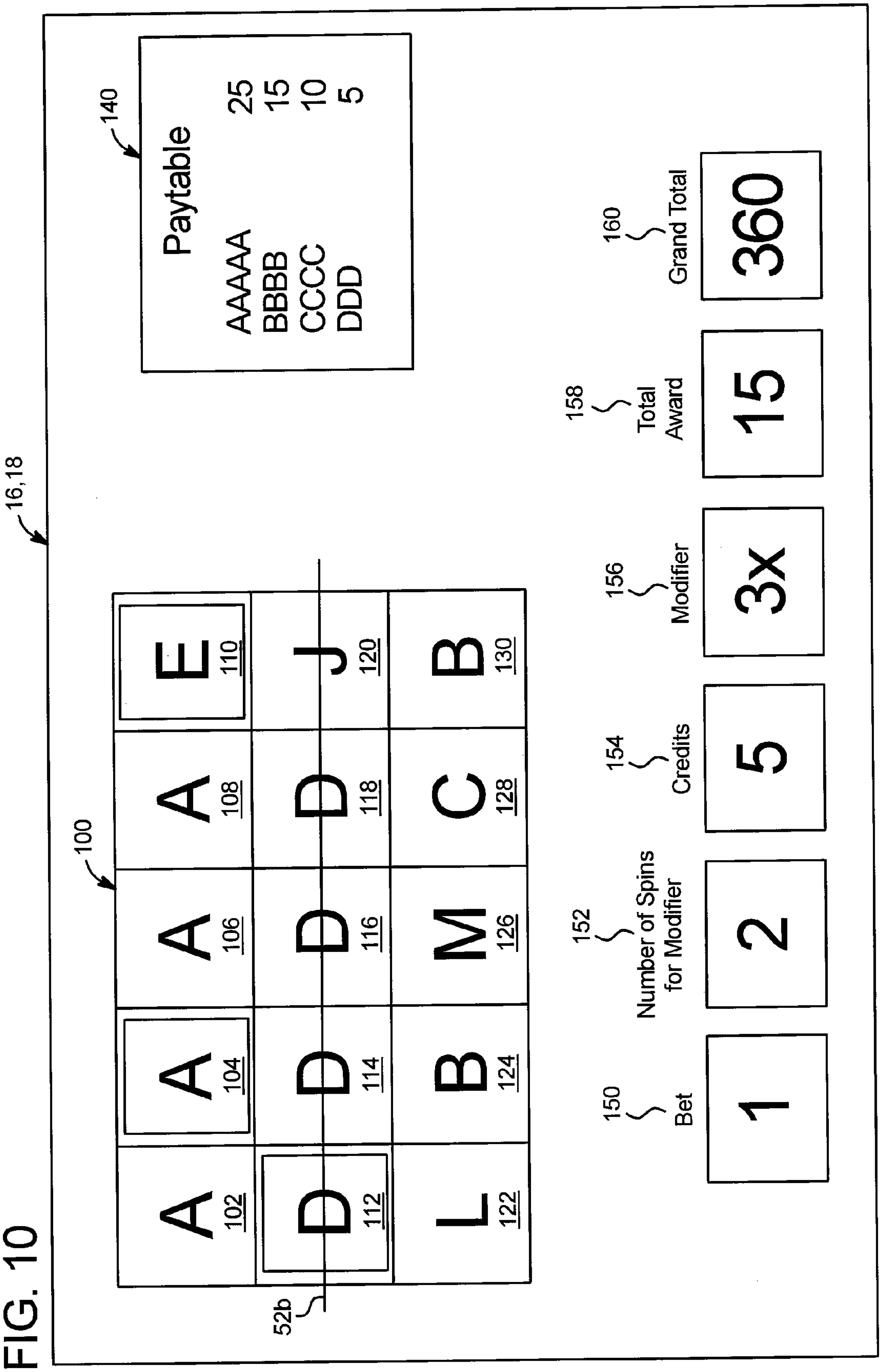

In various embodiments described herein, an indicator symbol may be generated during any symbol generation and may indicate the same or different symbol display areas to be modification symbol display areas as a previously displayed indicator symbol. Alternatively, the gaming device may not generate a subsequent indicator symbol until all of the Spins for the first indicator symbols are used. As illustrated in FIG. 9, upon a subsequent generation and display of symbols on the reels, the gaming device generates and displays an indicator symbol 172 in symbol display area 116. The indicator symbol indicates symbol display areas 104, 110 and 112 to be modifier symbol display areas.

In one embodiment, a modifier is associated with only the subsequently modification symbol display areas. In an embodiment, if a modifier symbol display area is subsequently indicated by a subsequently generated indicator symbol, the new modifier is combined with the existing modifier. Awards associated with symbols generated and displayed in such an indicated symbol display areas may be modified by more than one modifier associated with the same symbol display area. In an embodiment, a modifier is associated with the modification symbol display areas in addition to any existing modification symbol display areas. For example, in the illustrated embodiment, awards associated with symbols generated and displayed in symbol display areas 104, 110, 112, 124 and 128 may be modified.

In various embodiments, the modifier associated with each indicated symbol display area may increase, decrease or remain the same for any number of generations of symbols or generations of an indicator symbol. In FIG. 9, the multiplier associated with the modification symbol display areas is increased from 2× to 3× for a subsequent generation of the indicator symbol. Hence, in the illustrated embodiment, a 3× modifier is associated with each of modification symbol display areas 104, 110 and 112, and a 2× modifier is associated with modification symbol display areas 120, 124 and 130. In different embodiment, the determination of if each modifier associated with each indicated symbol display area changes is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, the modifier associated with a symbol display area is replaced with the modifier of a subsequent indication of that symbol display area. For example, symbol display area 110 is associated with a 2× modifier based on its indication by the indicator symbol 170 initially generated and displayed by the gaming device as illustrated in FIG. 4. However, symbol display area 110 is again indicated by the indicator symbol 172 generated and displayed by the gaming device in symbol display area 116 as illustrated in FIG. 9. In the illustrated embodiment, the 3× modifier associated with the subsequent indication of symbol display area 110 replaces the 2× modifier. It should be appreciated that the 3× modifier may replace or be combined with the 2× multiplier according to a mathematical operation as described above.

In one embodiment, an award associated with a winning symbol generated and displayed in a modification symbol display area during the same generation of the indicator symbol is modified. In the embodiment illustrated in FIG. 9, in addition to generating and displaying an indicator symbol 172, a winning combination of four "C" symbols is generated in symbol display areas 104, 106, 108, and 110 along payline 52*a*. According to paytable 140, an award amount of ten credits is associated with four "C" symbols as indicated in the Credits display 154. Two of the "C" symbols are displayed in modification symbol display areas 104 and 110. Modifier symbol display areas 104 and 110 are each associated with a 3× multiplier. In the illustrated embodiment, the 3× multipliers are added together to produce a 6× multiplier. It should be appreciated that the multipliers may be combined by any other suitable mathematical operation such as being multiplied together to produce a 9× multiplier to be applied to the award. The award amount of ten credits is modified by the 6× multiplier to produce an award of sixty credits as indicated in the Total Award display 158. The sixty credits is added to the previous cumulative number of credits to produce a grand total award of three hundred forty-five credits as indicated in the Grand Total display 160.

For each spin of the reels in the illustrated embodiment, the number of spins remaining during which a modifier is associated with the modification symbol display areas is decreased by one. In FIG. 9, the symbol display areas indicated by the first indicator symbol 170 and not indicated by the second indicator symbol 172 are no longer associated with a modifier. Therefore, symbol display areas 120, 124 and 130 are no longer highlighted as modification symbol display areas. However, since the gaming device generated and displayed another indicator symbol 172, and the player wagered three credits, the three symbol display areas, 104, 110 and 112 indicated by the indicator symbol remain associated with the 3× modifier for an additional three generations of symbols or activations of the reels. It should be appreciated that the continuing possibility of enhancing an award associated with symbols displayed in modification symbol display areas provides excitement and incentive for the player to continue play of the game.

Although, the illustrated embodiment includes paylines to indicate combinations of symbols to be evaluated as winning combinations associated with an award, it should be appreciated that the embodiments described herein may be applied to any other suitable method of combining symbols for evaluation, such as scatter pay and ways to win.

It should also be appreciated that the modification symbol display areas can apply to one or more wagered on or free activations or spins. It should also be appreciated that the modifier associated with each modification symbol display area may be modified for one or more or each activation or spin.

It should also be appreciated that the modifiers can be different in any suitable manner. For example, (a) two or more or all of the modifiers associated with two or more of the modification symbol display areas may be different; (b) two or more or all of the modifiers associated with the same modification symbol display area for two or more all different symbol generations may be different; (c) the modifiers associated with each of one or more of the modification symbol display areas may increase, decrease or remain the same for different symbol generations; and (d) the modifiers associated with each of one or more of the modification symbol display areas may change based on the outcome of the symbol generations.

In different embodiments, the modifiers associated with the modification symbol display areas are predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of operating a gaming system, said method comprising:

(a) causing at least one display device to display a game including a plurality of symbols, the symbols including at least one designator symbol, the symbols being displayable at a plurality of symbol display areas, (b) causing the at least one display device to display a first random generation of one of the symbols at each of the symbol display areas, (c) for said first random generation:

(i) if said displayed symbols include a designated number of the designator symbols, based on said displayed designator symbols, causing the at least one display device to display an indication of a designated amount of the symbol display areas as award modification symbol display areas for a designated quantity of subsequent generations of the symbols, the designated number being at least one, the designated amount being at least one, and the designated quantity being at least one, (ii) causing at least one processor to execute a plurality of instructions to determine whether any winning symbol combinations are displayed, and (iii) if any winning symbol combinations are displayed, causing the at least one display device to display any awards associated with said displayed winning symbol combinations, (d) causing the at least one display device to display a second random generation of one of the symbols at each of the symbol display areas, the second random generation being one of the designated quantity of subsequent generations, and (e) for said second random generation, if any winning symbol combinations including at least one symbol displayed at one of said award modification symbol display areas are displayed, for at least one of said displayed winning symbol combinations, causing the at least one processor to execute the plurality of instructions to modify any award associated with said at least one displayed winning symbol combination and display said modified award.

2. The method of claim 1, which includes causing the at least one display device to display a plurality of reels, said symbols being on said reels.

3. The method of claim 1, wherein, if said displayed symbols include the designated number of the designator symbols, the symbol display areas that are indicated as award modification symbol display areas are different than any symbol display areas at which said designated symbol is displayed.

4. The method of claim 1, wherein the designated amount more than one.

5. The method of claim 1, wherein the designated quantity is more than one.

6. The method of claim 1, wherein the designated quantity of subsequent generations is randomly determined.

7. The method of claim 1, wherein the designated quantity of subsequent generations is based on an amount of a wager on the first random generation.

8. The method of claim 1, wherein the first random generation is a first play of the game and the second random generation is a second play of the game.

9. The method of claim 1, wherein the first random generation is a first play of the game initiated upon placement of a first wager by a player and the second random generation is a second play of the game initiated upon placement of a second wager by the player.

10. The method of claim 1, wherein the first random generation is a first play of the game initiated upon placement of a wager by a player and the second random generation is a second free play of the game.

11. The method of claim 1, wherein the designated amount is at least two, wherein said award modification symbol display areas include at least a first award modification symbol display area and a second, different award modification symbol display area, said first award modification symbol display area being associated with a first modifier, said second different award modification symbol display area being associated with a second, different modifier.

12. The method of claim 1, which includes: for said first random generation, if any winning symbol combinations including at least one symbol displayed at one of said award modification symbol display areas are displayed, for at least one of said displayed winning symbol combinations, causing the at least one processor to execute the plurality of instructions to modify any award associated with said at least one displayed winning symbol combination and causing the at least one display device to display said modified award.

13. The method of claim 1, which includes: for said second random generation, if any winning symbol combinations including at least one symbol displayed at one of said award modification symbol display areas are displayed, for each of said displayed winning symbol combinations, causing the at least one processor to execute the plurality of instructions to modify any award associated with said displayed winning symbol combination and causing the at least one display device to display said modified award.

14. The method of claim 1, which is provided through a data network.

15. The method of claim 14, wherein the data network is the internet.

16. A method of operating a gaming system, said method comprising:

(a) causing at least one display device to display a game including a plurality of symbols, the symbols including at least one designator symbol, the symbols being displayable at a plurality of symbol display areas, (b) causing the at least one display device to display one of the symbols at each of the symbol display areas, (c) if said displayed symbols include a designated number of the designator symbols, based on said displayed designator symbols, causing the at least one display device to display an indication of a designated amount of the symbol display areas as award modification symbol display areas for a designated quantity of subsequent generations of the symbols, the designated number being at least one, the designated amount being at least one, and the designated quantity being at least one, (d) for said generation, if any winning symbol combinations are displayed, causing the at least one display device to display any awards associated with said displayed winning symbol combinations, and (e) for each generation of the symbols of said quantity of subsequent generations of the symbols, if any winning symbol combinations including at least one symbol displayed at one of said award modification symbol display areas are displayed, for at least one of said displayed winning symbol combinations, causing at least one processor to execute a plurality of instructions to modify any award associated with said at least one displayed winning symbol combination and display said modified award.

17. The method of claim 16, which includes causing the at least one display device to display a plurality of reels, said symbols being on said reels.

18. The method of claim 16, wherein the designated amount is more than one.

19. The method of claim 16, wherein the designated quantity is more than one.

20. The method of claim 16, wherein the designated quantity of subsequent generations is based on an amount of a wager on the first generation.

21. The method of claim 16, wherein the generations are configured in one of the following manners: (a) the first generation is a first play of the game and the subsequent generations are second plays of the game; (b) the first generation is a first play of the game initiated upon placement of a first wager by a player and each of the subsequent generations is a play of the game initiated upon placement of a further wager by the player; and (c) the first generation is a first play of the game initiated upon placement of a wager by a player and each subsequent generation is a free play of the game.

22. The method of claim 16, which includes: for said generation, if any winning symbol combinations including at least one symbol displayed at one of said award modification symbol display areas are displayed, for at least one of said winning symbol combinations, causing the at least one processor to execute the plurality of instructions to modify any award associated with said displayed winning symbol combination and causing the at least one display device to display said modified award.

23. The method of claim 16, which includes: for each of said subsequent generations, if any winning symbol combinations including at least one symbol displayed at one of said award modification symbol display areas are displayed, for each of said winning symbol combinations, causing the at least one processor to execute the plurality of instructions to modify any award associated with said displayed winning symbol combination and causing the at least one display device to display said modified award.

24. The method of claim 16, which is provided through a data network.

25. The method of claim 24, wherein the data network is the internet.

* * * * *

UNITED STATES PATENT AND TRADEMARK OFFICE

CERTIFICATE OF CORRECTION

PATENT NO. : 8,651,945 B2
APPLICATION NO. : 13/654017
DATED : February 18, 2014
INVENTOR(S) : Roman A. Souza et al.

It is certified that error appears in the above-identified patent and that said Letters Patent is hereby corrected as shown below:

IN THE CLAIMS

In Claim 1, Column 26, Line 10, between “the” and “designator” insert --at least one--.
In Claim 1, Column 26, Line 10, replace “symbols” with --symbol--.
In Claim 3, Column 26, Line 46, between the second instance of “the” and “designator” insert --at least one--.
In Claim 3, Column 26, Lines 46 to 47, replace “symbols” with --symbol--.
In Claim 3, Column 26, Line 49, replace “designated” with --at least one designator--.
In Claim 4, Column 26, Line 51, after “amount” insert --is--.
In Claim 15, Column 27, Line 34, replace “the” with --an--.
In Claim 16, Column 27, Line 44, between “the” and “designator” insert --at least one--.
In Claim 16, Column 27, Line 44, replace “symbols” with --symbol--.
In Claim 16, Column 27, Line 52, delete “for said generation”.
In Claim 20, Column 28, Line 20, delete “on the first generation”.
In Claim 21, Column 28, Lines 22 to 23, delete “the first generation is a first play of the game and”.
In Claim 21, Column 28, Lines 24 to 26, delete “the first generation is a first play of the game initiated upon placement of a first wager by a player and”.
In Claim 21, Column 28, Line 28, replace the first instance of “the” with --a--.
In Claim 21, Column 28, Lines 28 to 30, delete “the first generation is a first play of the game initiated upon placement of a wager by a player and”.
In Claim 22, Column 28, Lines 32 to 33, delete “for said generation”.
In Claim 25, Column 28, Line 53, replace “the” with --an--.

Signed and Sealed this
Twenty-first Day of July, 2015

Michelle K. Lee

Michelle K. Lee
*Director of the United States Patent and Trademark Office*